United States Patent [19]

Karz et al.

[11] Patent Number: 5,689,294

[45] Date of Patent: Nov. 18, 1997

[54] METHOD AND APPARATUS FOR SKIPPING WHITE SPACES IN MARKING DEVICES

[75] Inventors: Robert S. Karz, Webster; Thomas N. Taylor, Rochester, both of N.Y.

[73] Assignee: Xerox Corporation, Stamford, Conn.

[21] Appl. No.: 367,612

[22] Filed: Jan. 3, 1995

[51] Int. Cl.⁶ .............................. B41J 2/145; B41J 2/15; B41J 29/38
[52] U.S. Cl. ............................................ 347/40; 347/14
[58] Field of Search .................................. 347/40, 15, 14; 358/486, 449, 438

[56] References Cited

U.S. PATENT DOCUMENTS

| | | | |
|---|---|---|---|
| 3,643,016 | 2/1972 | Dattilo | 358/438 |
| 5,032,923 | 7/1991 | Kurtin et al. | 358/296 |
| 5,430,469 | 7/1995 | Shioya et al. | 347/15 |
| 5,453,777 | 9/1995 | Pensavecchia et al. | 347/234 |

Primary Examiner—Benjamin R. Fuller
Assistant Examiner—Thinh Nguyen
Attorney, Agent, or Firm—Oliff & Berridge

[57] ABSTRACT

A method of skipping white spaces during the marking of an image onto a recording medium with a marking device includes the steps of detecting a white space in the image between a previous image block and a next image block, positioning a marking element of the marking device adjacent an output starting position on the recording medium, and marking the next image block on the recording medium. The marking device includes a marking element and a controller. Each white space is interposed between two image blocks, which include adjacent image data lines. The controller controls the marking element to mark the image in swaths. Each swath of the marking element is capable of marking more than one image data line. The output starting position is determined such that the marking device marks the next print block using a minimum number of swaths. As a result, the operating speed and throughput of the marking device are increased.

23 Claims, 5 Drawing Sheets

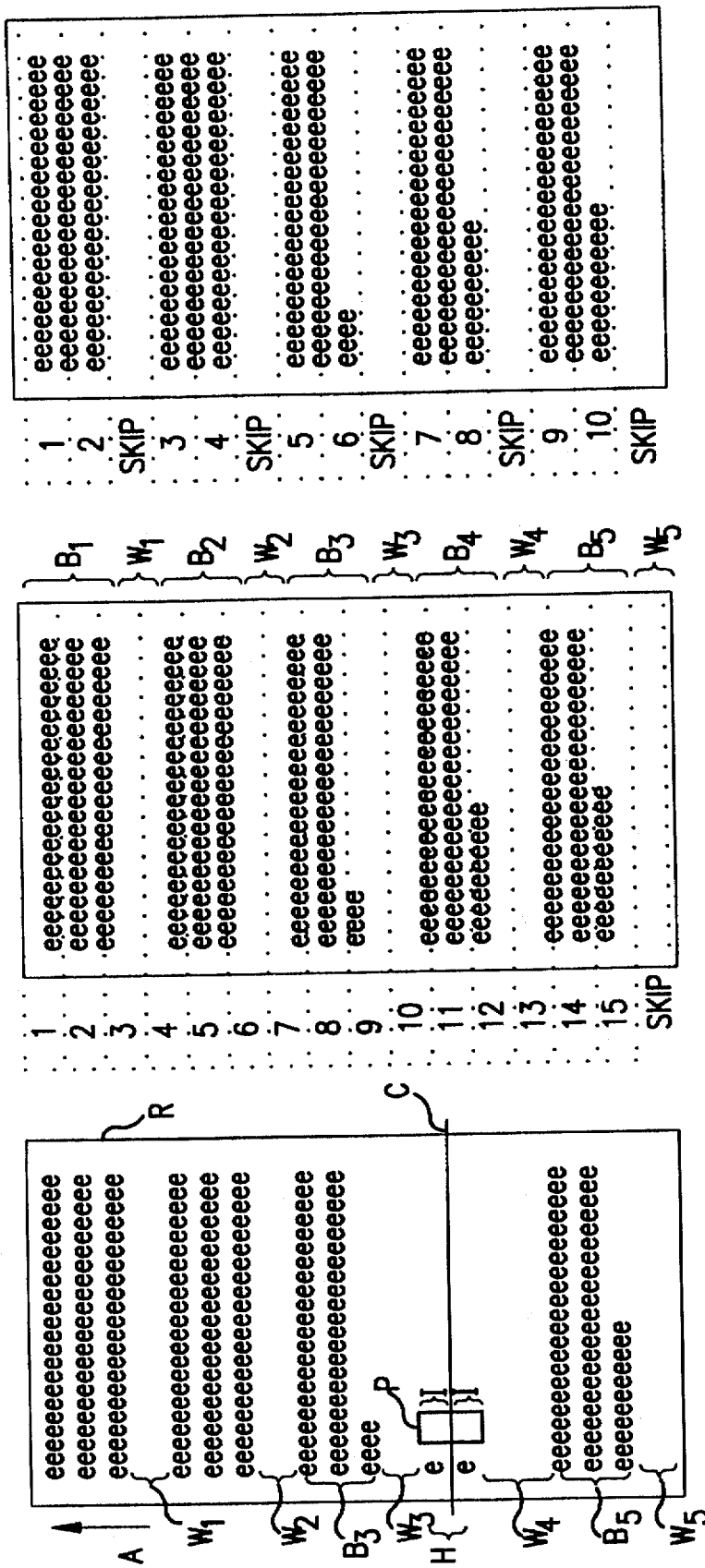

METHOD AND APPARATUS FOR SKIPPING WHITE SPACES IN MARKING DEVICES

BACKGROUND OF THE INVENTION

The present invention relates to a method of optimizing the operation of a marking device, and in particular, to a method of skipping white spaces during the marking of an image onto a recording medium.

White space skipping is a technique for increasing the operating speed and throughput of a marking device, such as, e.g., a printer or a facsimile machine. In white space skipping, the marking device is configured to detect areas of an image to be printed that are to be left blank (i.e., the white spaces) on the recording medium. If a white space of a predetermined size is detected in the image, the marking device moves the recording medium and/or a marking element past (i.e., skips) the white space so that the next line of image data can be marked. When a white space is skipped, the recording medium and/or the marking element move at a higher rate than when image data are being marked. As a result, white space skipping reduces the time expended between marking blocks of image data and therefore, increases the overall throughput of the marking device.

Providing white space skipping capability in printers is known. White space skipping can be used in all printer types, including printers having a partial-width scanning printhead that reciprocates along a carriage. As shown in FIG. 1, a scanning printhead P is mounted to reciprocate along a carriage C that extends across the width of a recording medium R. The carriage is perpendicular to the length of the recording medium and its direction of travel during printing, i.e., perpendicular to the direction A. The transverse dimension of the scanning printhead P, measured parallel to the direction A, defines a printhead height H. The printhead height H spans a printing swath equal to one and at least a portion of an adjacent line of image data, e.g., a line of characters. Each image block $B_n$ includes at least two adjacent lines of printed characters. The height of each image block is defined as the distance between the uppermost pixel of the first image data line and the lowermost pixel of the last image data line. For the purposes of illustration, image block $B_3$ is shown as it actually appears after printing, and image block $B_5$ is shown as it would appear after printing.

During a conventional white space skipping routine, the recording medium R is indexed by a uniform increment I of the printhead height H. In other words, an integral number (e.g., 2) of increments I is exactly equal to the printhead height H. If, for example, a white space Wn equal to the printhead height H is detected, the printer indexes the white space $W_n$ past the printhead P. The printer indexes the recording medium R by a distance equal to the printhead height H. As a result, the printer can index the recording medium R to a point at which the next block $B_5$ is to be positioned and can begin printing without the delay of performing an unnecessary printing cycle (i.e., moving the printhead to the right and then back to the left as would occur during normal printing of an image). This conventional white space skipping routine, however, only allows skipping a white space that begins in alignment with an upper printing edge of the printhead and that has a height at least as great as the printhead height H.

In other words, as shown in FIG. 2, the conventional white space skipping routine does not allow skipping white spaces $W_1, \ldots, W_4$, all of which have a height equal to or greater than the printhead height H, because the beginning of each respective white space lies in a swath within which a portion of a line of characters must be printed. For example, although the white space $W_1$ between the image block $B_1$ and the image block $B_2$ is equal in height to the printhead height H, the white space $W_1$ cannot be skipped because the printhead P must print part of the last line of image block $B_1$ in the third swath and a portion of the first line of image block $B_2$ in the fourth swath. As a result, only a white space $W_5$ that begins in alignment with the upper printing edge of the printhead P in the sixteenth swath and has a height at least as great as the printhead height H can be skipped.

Accordingly, the conventional white space skipping routine does not provide for skipping all the white spaces that have a height at least as great as the printhead height H. Consequently, providing a marking device that detects and skips white spaces according to the layout of the image blocks in each image segment would be advantageous.

SUMMARY OF THE INVENTION

An object of the present invention is to provide a method and apparatus for skipping white spaces that overcomes the deficiencies of the prior art.

This and other objects are achieved by the present invention. The marking device includes a controller and a marking element. The marking element is controlled by the controller to mark the recording medium in swaths, each of the swaths covering more than one image data line. The method includes the steps of detecting a white space between a previous image block and a next image block, positioning the marking element adjacent an output starting position on a recording medium for the next image block, and marking the next image block on the recording medium using a minimum number of swaths.

The step of detecting can include determining whether the height of the white space exceeds a predetermined height. Preferably, the predetermined height equals or exceeds the height of the marking element.

The step of positioning can include a step of calculating a number of complete swaths required to mark the next image block, and the step of calculating can include measuring the height of the next image block and subtracting it from the number of complete swaths to generate a remainder. The step of calculating can further include generating a random number greater than 0 but less than or equal to 1 and multiplying the random number by one minus remainder to generate an offset distance. The offset distance can be controlled to vary within a predetermined range. The output starting position for marking the next image block is offset from the first image line by the offset distance.

Because the relationship between the marking element and the recording medium is changed by a nonintegral multiple of the marking element height, the image can be marked using a minimum number of swaths, thereby increasing the throughput of the marking device. The relationship between the marking element and the recording medium can be changed by indexing the recording medium, moving the marking element, or a combination of both indexing the recording medium and moving the marking element.

The marking device of the present invention can include a scanning marking element, in which case the marking device further includes a carriage on which the scanning marking element reciprocates to move across the recording medium. The controller can be connected to a memory that stores the images to be marked onto the recording medium.

The marking element can be an ink jet printhead, in which case the marking device is an ink jet printer. The ink jet printhead includes an array of apertures disposed in alignment to expel ink toward the recording medium.

BRIEF DESCRIPTION OF THE DRAWINGS

A complete understanding of the present invention may be obtained by reference to the accompanying drawings, when considered in conjunction with the subsequent detailed description thereof, in which:

FIG. 1 is a schematic view showing a document being produced using a conventional white space skipping routine by a marking device having a scanning marking element;

FIG. 2 is a plan view of a completed document showing the number of swaths required using the conventional white space skipping routine;

FIG. 3 is a plan view of the completed document showing the number of swaths required using the white space skipping method of the present invention;

DETAILED DESCRIPTION OF PREFERRED EMBODIMENTS

Figure 5:
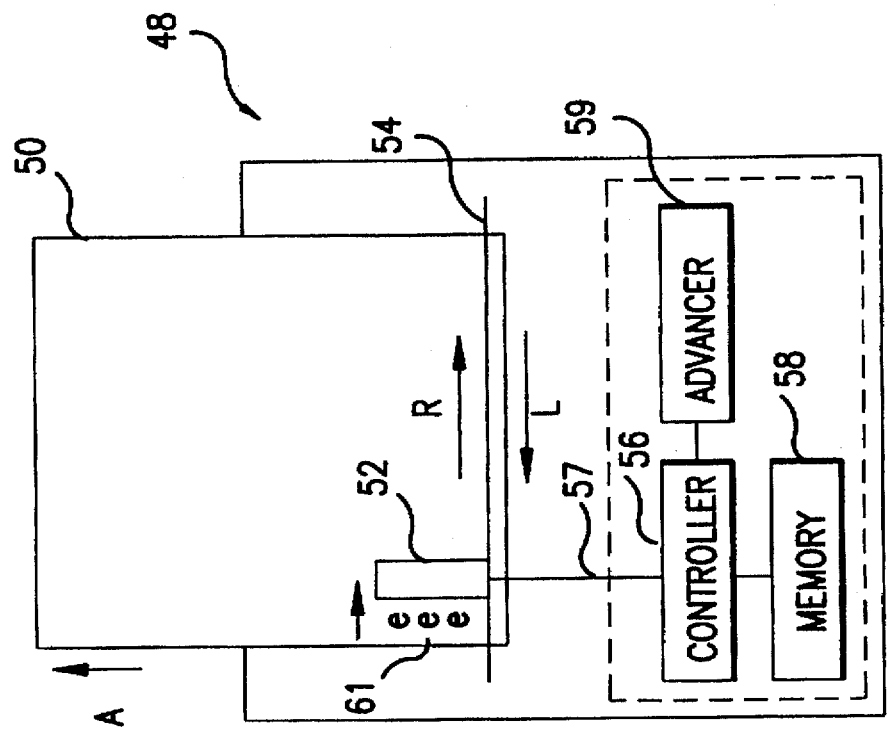
FIG. 5 is a schematic view of a thermal ink jet printer having a scanning element according to one embodiment of the present invention.

In FIG. 5, a printer 48 according to one embodiment of the present invention is shown. The printer 48 includes a recording medium 50 and a scanning printhead 52 that is mounted to a carriage 54. The printhead 52 is connected by a known flexible connector 57 to a controller 56. The controller 56 controls the printhead 52 to print while the printhead 52 moves to the right in the direction R. The printhead 52 returns by moving to the left in the direction L. The controller 56 is connected to an advancer 59. When the printhead reaches the end of its stroke near the right side of the carriage 54, the controller signals the advancer to index the recording medium 50. In FIG. 5, the printhead 52 is shown moving in the direction R during the printing of a swath 61 of three image data lines.

The controller 56 is also connected to a memory 58 that stores images to be printed. As shown in FIG. 5, the memory 58 is disposed within the printer 48. Alternatively, however, the memory 58 could be disposed elsewhere, e.g., within an external device such as a computer.

Figure 6:
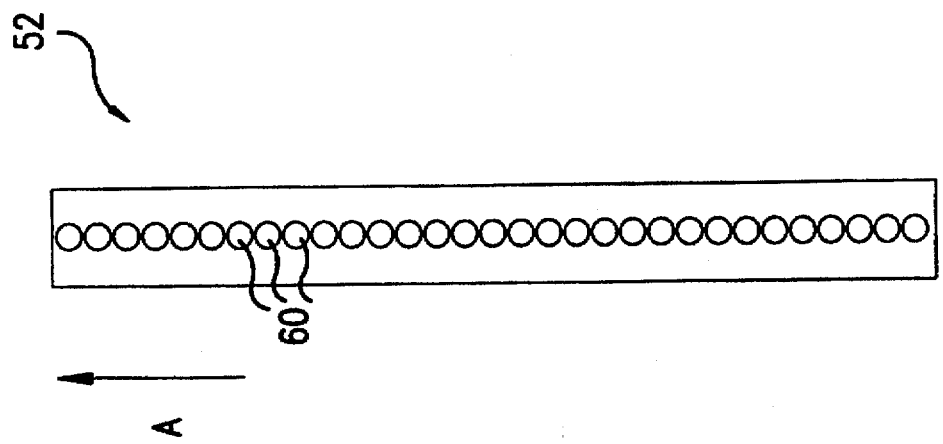
FIG. 6 is an enlarged schematic view of the printhead of FIG. 5, showing the surface of the printhead that faces the recording medium.

In FIG. 6, an enlarged view of the printhead 52 as viewed from the direction of the recording medium 50 is shown. In one embodiment, the printhead 52 includes a plurality of apertures 60 through which ink jets selectively expel ink toward the recording medium 50 to produce image data lines and spaces. The apertures 60 are aligned in the direction A. Alternatively, the apertures 60 can be aligned in an alignment direction at an angle with respect to the direction A (not shown), in which case one component of the alignment direction is parallel to the direction A and the other component is parallel to the image data lines.

Figure 4:
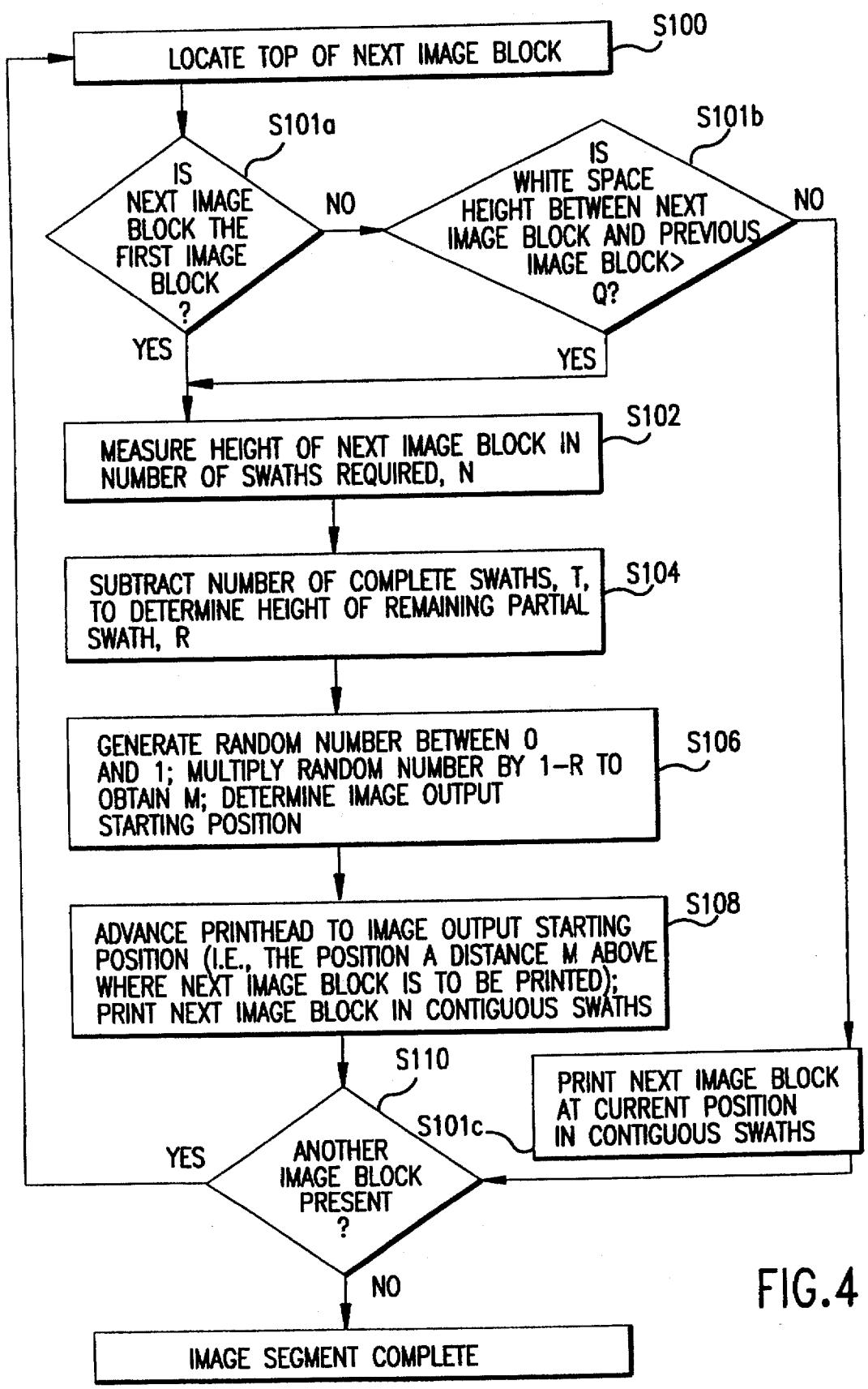
FIG. 4 is a flow chart showing an embodiment of the method of the present invention.

The operation of a marking device according to the present invention will be described with reference to FIG. 4. In step S100, the controller locates the top of a next image block. In the case of a new image segment, e.g., a new page, the next image block can be a first image block. In step S101a, the controller determines whether the next image block is the first image block of the image segment. If so, the operation proceeds to step S102, and the first image block is printed according to the operation described below in steps S104–S108.

If the next image block is not the first image block, the operation proceeds to step S101b. In step S101b, the controller determines whether a white space height between the next image block and the previous image block exceeds a predetermined height Q. The distance is determined between the lowermost pixel of the last image data line of the previous image block and the uppermost pixel of the first image data line of the next image block. The predetermined height Q is preferably set to equal or exceed the marking element height. If the white space height does not exceed the predetermined height Q, the next image block is printed at the current position of the marking element in contiguous swaths (step S101c), and the operation proceeds to step S110.

In step S102, if the next image block is the first image block or if the white space height exceeds the predetermined height, the next image block height N is measured in terms of the number of swaths required to output the next image block. In other words, the next image block height can be a nonintegral number equal to the height of one or more complete swaths and a partial swath, e.g., 1.5 total swaths. In step S104, an integral number of complete swaths T is subtracted from the next image block height N to determine the remaining partial swath height R. The remaining partial swath height R is always less than 1 swath.

In step S106, random number exceeding 0 but less than or equal to 1 is generated. The random number is multiplied by one minus the remainder (i.e., 1–R) to obtain an offset distance M. The output starting position is determined to be offset from the top of the first image data line of the next image block by the offset distance M. Accordingly, the portion of the marking element that is used to mark the uppermost pixel of the first image data line of the next image data block can be varied such that each portion of the marking element is evenly used. Correspondingly, and depending upon the offset distance M, the lowermost portion of the marking element will project below the last image data line of the image block being marked by a residual value S, where S=1–R–M. (See the examples below.)

In the case of an ink jet printer, the output starting position is randomly varied to even the use of and wear on the ink jets. Alternatively, the offset distance M can be controlled to randomly vary within a predetermined range to suit particular operating requirements. If an ink jet printhead is advanced such that the uppermost portion of the first image data line in each image block is printed by the first several ink jets, the first several ink jets would wear more quickly than the others. Accordingly, the printing quality in the region of the first several ink jets decreases. As a result, the user must replace the printhead sooner than if all the ink jets were used evenly.

In step S108, the marking element advances to the image output starting position, and the next image block is output in a minimum number of contiguous swaths. After outputting of the next image block is completed, the next image block becomes the previous image block. In step S110, the controller determines whether another image block is present in the image segment. If another image block is present, the controller returns and executes the routine beginning with step S100. If another image block is not present, the image segment is complete, and the routine is concluded.

The length of the image segment can be a page, a portion thereof, or any other suitable length. Accordingly, if the image segment is the length of the page, the marking device can be configured to minimize the number of swaths per page. If the image segment is a portion of a page, e.g., half of a page, the marking device is configured to minimize the number of swaths required to complete each half page.

Figure 7:
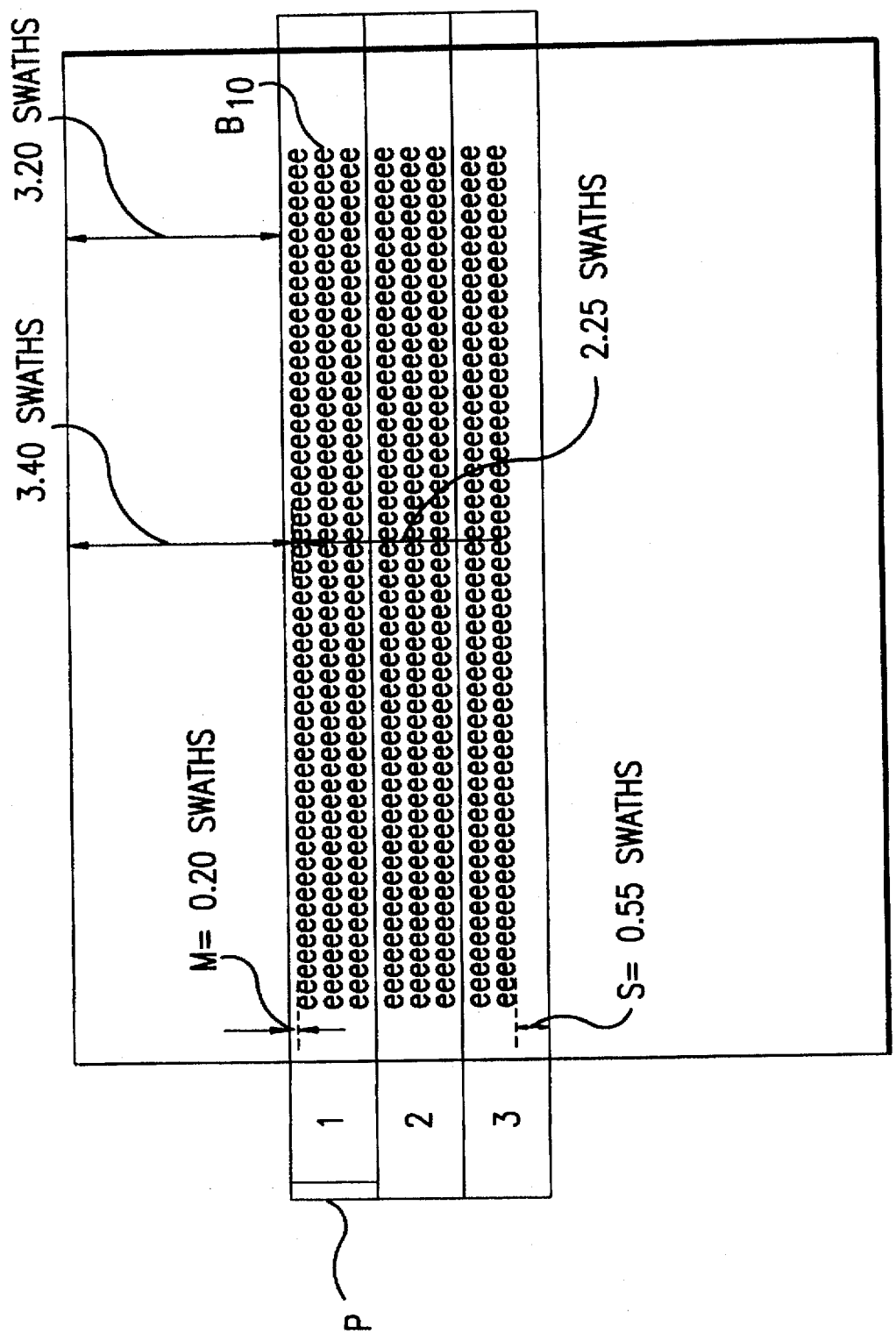
FIG. 7 is a schematic view showing a document being produced according to the method of the present invention.

In FIG. 7, for example, an image block $B_{10}$ that includes eight image data lines and spans a height equal to 2.25 swaths of the printhead P is shown. The image block $B_{10}$ begins at a distance equal to 3.40 swaths from the top edge of the page. According to step S104 as shown in FIG. 4, the height of the image block $B_{10}$ in terms of the total number of swaths required to print it (i.e., 2.25) minus the number of complete swaths (i.e., 2) yields the remainder R, i.e., 0.25. If the random number in step S106 is determined to be 0.27, the offset distance M, which equals one minus the remainder R (i.e., 0.75) multiplied by the random number (i.e., 0.27) is 0.20 swaths. Correspondingly, one minus the remainder R minus the offset distance yields the residual value S, or 1−R−M=S=0.75−0.20=0.55 swaths. Accordingly, a lower portion of the printhead equal to 0.55 swaths extends below the last line of the image block $B_{10}$ during the third and final swath of the printhead P. Printing begins at the image output starting position, which is equal to the point at which the image block $B_{10}$ begins (i.e., 3.40) minus the offset distance (i.e., 0.20), i.e., 3.20 swaths down the page.

Figure 8:
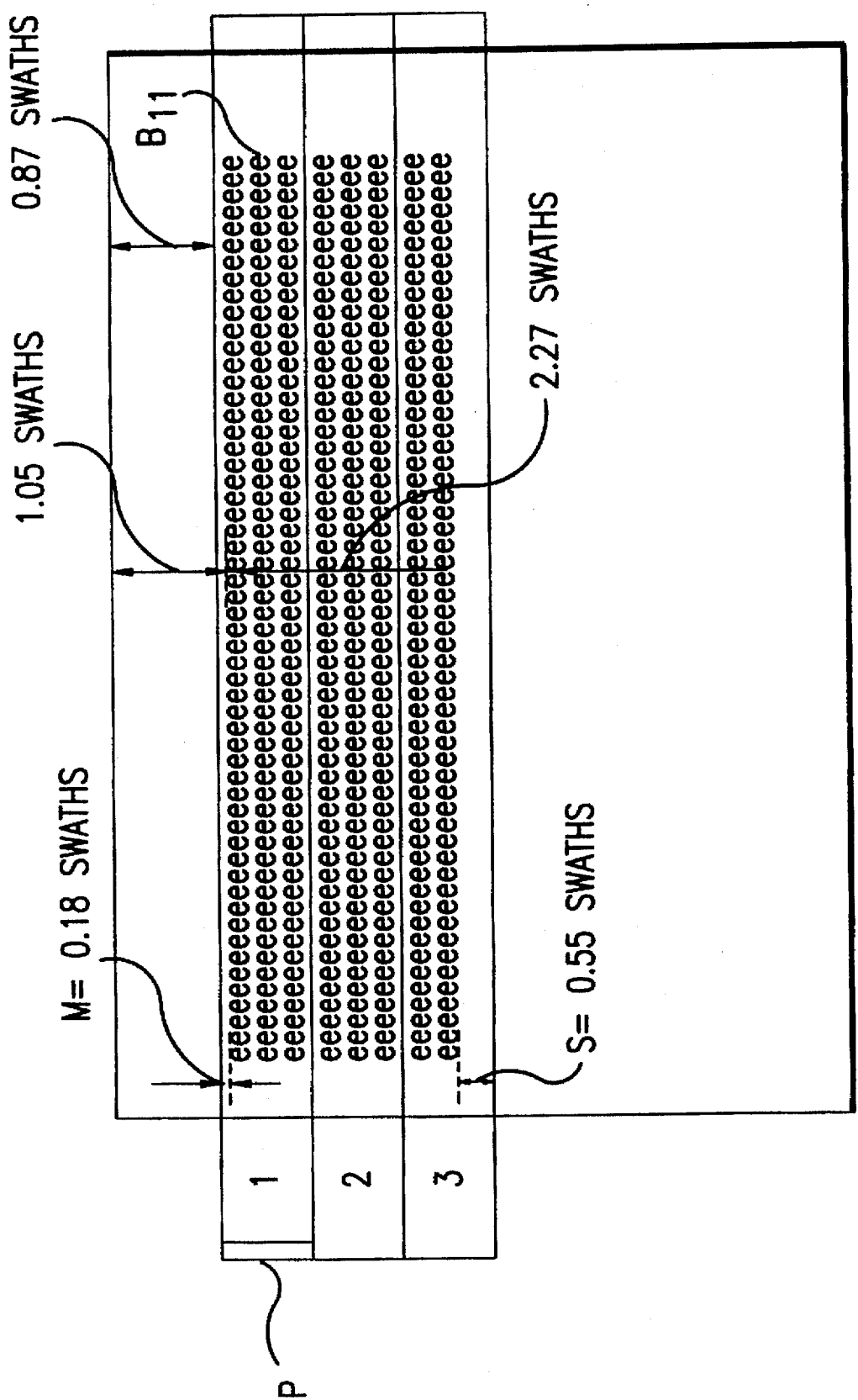
FIG. 8 is a schematic view showing another document being produced according to the method of the present invention.

In FIG. 8, another example of a document being printed according to the method of the present invention is shown. As shown in FIG. 8, an image block $B_{11}$ begins at a distance equal to 1.05 swaths of the printhead P from the top of the page or, alternatively, from the last line of pixels in the last image data line of the previous image block (not shown). The height of the image block $B_{11}$ is 2.27 swaths; therefore, the number of complete swaths is 2 and the remainder is 0.27 swaths. If the random number is 0.247, then 1−R multiplied by the random number yields an offset distance M of 0.18 swaths. Correspondingly, the residual value S equals 1−R−M or 0.73−0.18=0.55 swaths. Accordingly, because the white space height (i.e., 1.05) is greater than the printhead height H, the white space can be skipped, even though the distance between the resulting output starting position and the top of the page (or the bottom of the previous image block), i.e., 0.87 swaths, is less than the printhead height H.

In FIG. 2, a one-page document produced by a conventional white space skipping routine is shown. According to this illustration, outputting the five image blocks, each of which have three image data lines, requires 15 swaths of the marking element. The sixteenth and last swath is skipped. As shown in FIG. 3, the same one-page document can be output with 10 swaths according to the white space skipping routine of the present invention. In operation, the marking device sequentially determines that each of the five image blocks can be output in two swaths of the marking element. The space between each two consecutive image blocks is determined to be a white space and therefore, is skipped. By advancing the recording medium by a nonintegral multiple of the printhead height, the document can be produced using five fewer scans, which represents a timing savings of approximately 30%.

Alternatively, the marking device can be configured to ensure that image data lines are not split between swaths. If the position of the marking element will cause one or more image data lines to be split between swaths, the marking element is positioned to minimize the number of split image data lines with respect to the entire image segment. As a result, stitching errors that occur because of slight variations in the recording medium advancing distance, for example, do not produce noticeable overlap of or gaps between consecutive split image data lines.

Although the present invention is described in terms of marking devices in which the recording medium moves with respect to the marking element, the invention can also be embodied in a marking device in which the recording medium is stationary and the marking element is configured to move in the direction A.

Although this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method of marking an image on a recording medium using a marking device comprising a controller and a marking element, said marking element marking said recording medium in swaths, each of said swaths including at least one image data line and being equal to a heiqht of the marking element, said method comprising the steps of:

analzying the image to detect a white space between a previous image block of image data lines and a next image block of imag data lines;

determining a number of complete swaths required to mark the next image block;

generating a remainder equal to the number of complete swaths minus a height of the next image block;

calculating an offset distance using the remainder;

positioning said marking element at an output starting position on said recording medium said output starting position being disposed at the offset distance above a first image data line of the next image block; and marking said next image block on said recording medium.

2. The method of claim 1; wherein said step of analyzing includes determining a white space height of said white space, said white space height being a distance between a last image data line of said previous image block and a first image data line of said next image block.

3. The method of claim 2, wherein said white space height is a distance between a lowermost pixel of said last image data line of said previous image block and an uppermost pixel of said first image data line of said next image block.

4. The method of claim 2, wherein said step of analyzing includes determining whether said white space height is at least as great as a predetermined height.

5. The method of claim 1, wherein said step of calculating the offset distance comprises generating a random number greater than 0 and not greater than 1 and multiplying the random number by 1 minus the remainder.

6. The method of claim 5, wherein a distance between said output starting position and a lowermost pixel of said last image data line of said previous image block is less than said predetermined height, and wherein the white space between said previous image block and said next image block is skipped, if said white space height minus said offset distance is less than said predetermined height.

7. The method of claim 5, further comprising the step of controlling said offset distance to vary within a predetermined range.

8. The method of claim 1, wherein said step of marking includes moving said marking element relative to said recording medium.

9. A marking device for marking an image on a recording medium, said marking device comprising:

a marking element that marks said image in swaths in a marking direction, each of said swaths including at least one image data line and being equal to a height of the marking element; and a controller connected to said marking element, said controller determining an output starting position on said recording medium for positioning said marking element for marking an image block of image data lines in a number of complete swaths, wherein said marking element is controlled by said controller to mark said image on said recording medium starting from said output starting position.

10. The marking device of claim 9, further comprising a carriage that extends across said recording medium, wherein said marking element reciprocates along said carriage, said marking element printing in one direction and returning in an opposite direction.

11. The marking device of claim 9, Wherein said recording medium moves relative to said marking element in an indexing direction perpendicular to said marking direction, said marking device further comprising an advancer connected to said controller, wherein said controller signals said advancer to index said recording medium relative to said marking element in said indexing direction by an indexing interval.

12. The marking device of claim 11, wherein said controller signals said advancer when said marking element completes marking in said marking direction.

13. The marking device of claim 11, wherein said controller signals said advancer when said controller detects a white space.

14. The marking device of claim 11. wherein said indexing interval is a nonintegral multiple of a height of said marking element.

15. The marking device of claim 10, wherein said marking element is an ink jet printhead comprising a plurality of apertures through which an ink is expelled toward said recording medium, said plurality of apertures being aligned in a direction substantially perpendicular to said marking direction.

16. A method of marking an image onto a recording medium using a marking device comprising a marking element, said method comprising the steps of:

analyzing said image to determine a number of complete swaths required to mark the image;

positioning the marking element to mark the image with said number of complete swaths; and marking the image.

17. The method of claim 16, wherein said step of analyzing said image includes detecting a white space between a previous image block and a next image block, said previous image block and next image block each including adjacent image data lines.

18. The method of claim 17, wherein said step of analyzing includes measuring a next image block height of said next image block and subtracting said next image block height from said number of complete swaths to generate a remainder.

19. The method of claim 18, wherein said step of analyzing includes generating a random number greater than 0 and not greater than 1 and multiplying said random number by one minus said remainder to generate an offset value.

20. The method of claim 19, wherein said step of positioning includes moving the marking element to an output starting position, the output starting position being disposed between said previous image block and said next image block and offset from a first line of said next image block by said offset value.

21. The method of claim 20, further comprising the step of controlling said offset value to vary within a predetermined range.

22. A marking device for marking an image onto a recording medium, comprising:

means for analyzing said image;

means for determining a number of complete swaths required to mark the image which was analyzed;

means for positioning a marking element to mark the image which was analyzed; and means for marking the image which was analyzed in the number of complete swaths determined.

23. The method of claim 1, wherein said marking device further comprises a memory, and wherein said step of analyzing further comprises reading an image to be marked from the memory of said marking device.

* * * * *